Figure 1:
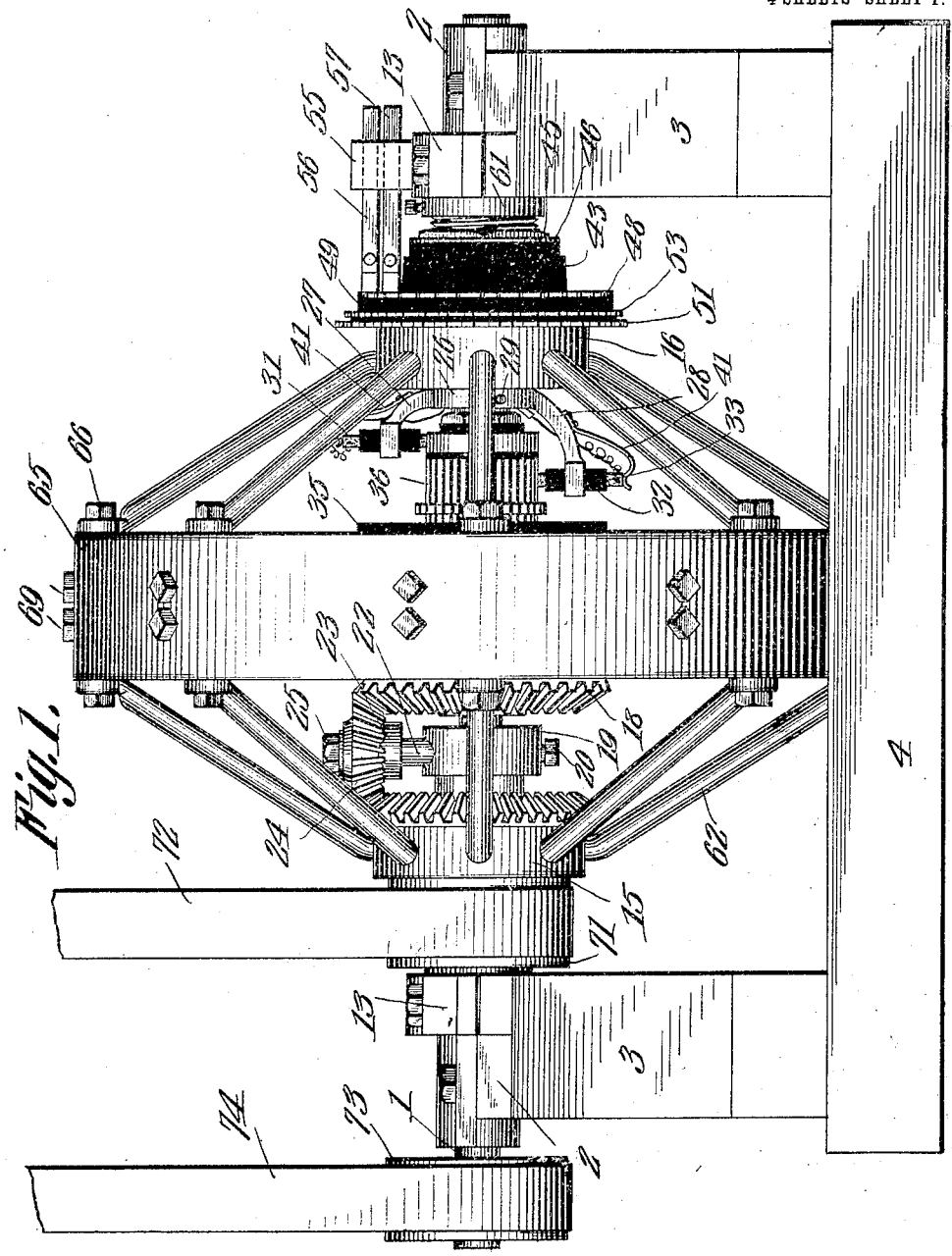

F. W. CASTERLINE.
ELECTRIC MOTOR.
APPLICATION FILED JAN. 9, 1911.

1,017,510.

Patented Feb. 13, 1912.

4 SHEETS—SHEET 1.

WITNESSES

F.W. Casterline INVENTOR,

BY

ATTORNEY.

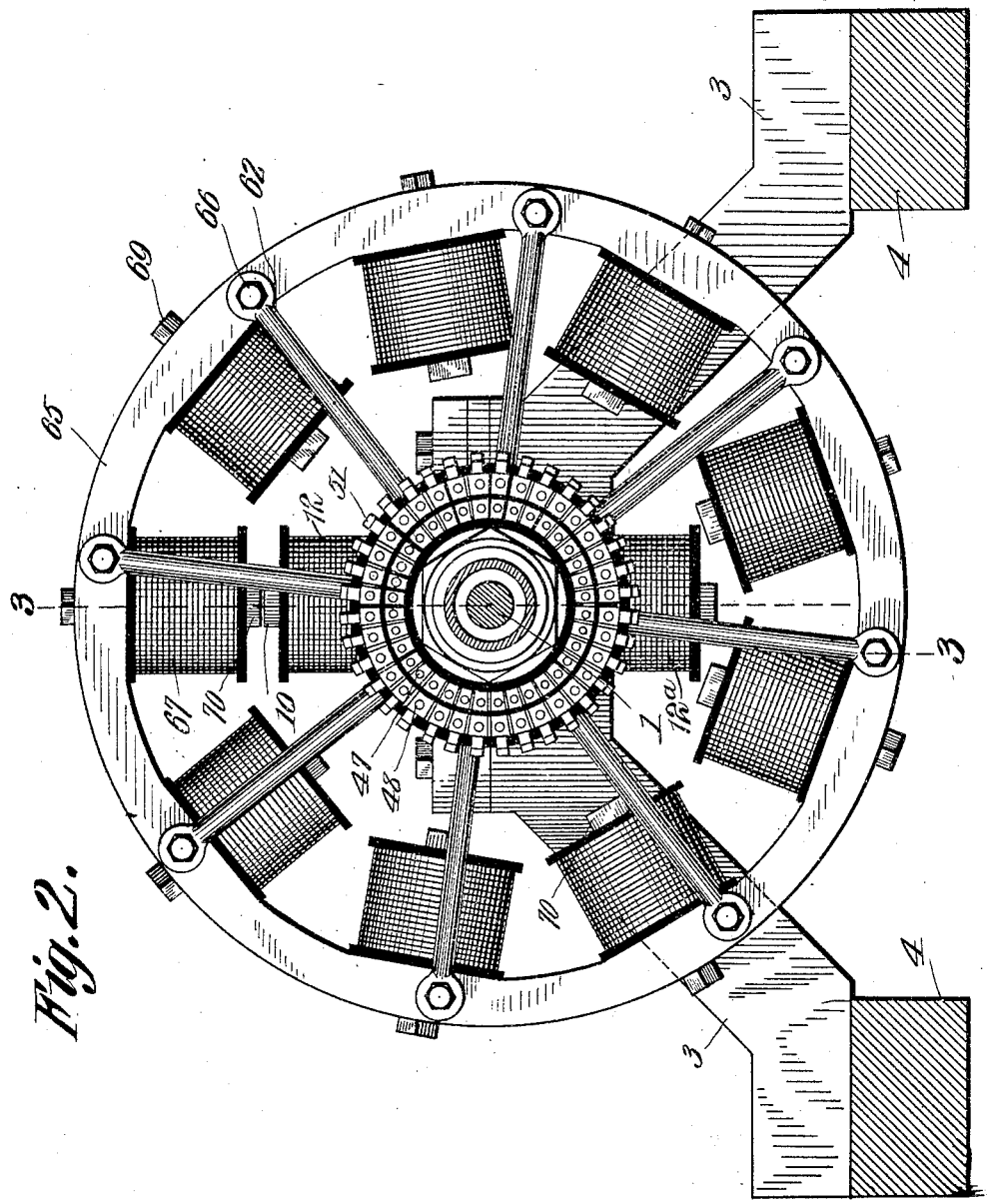

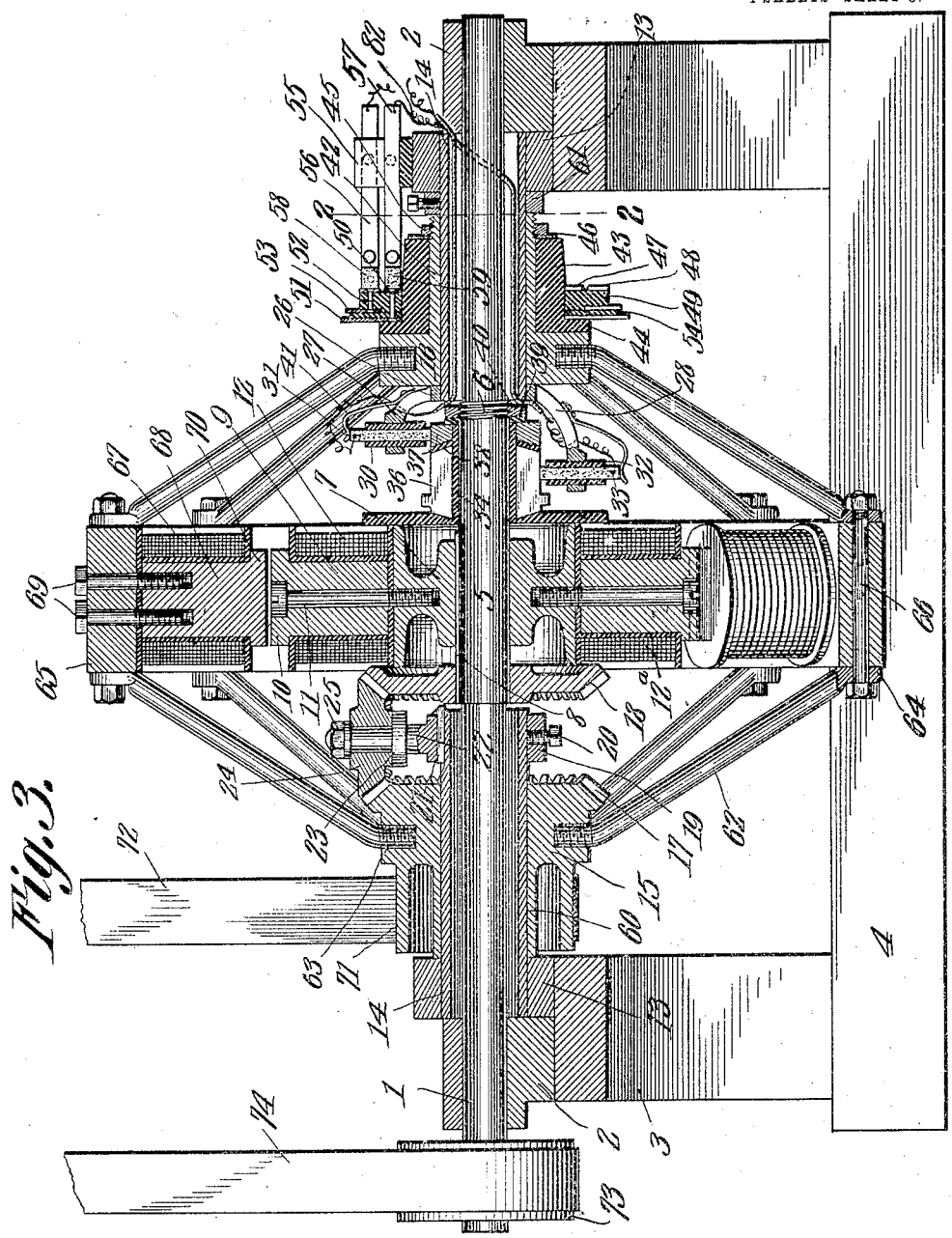

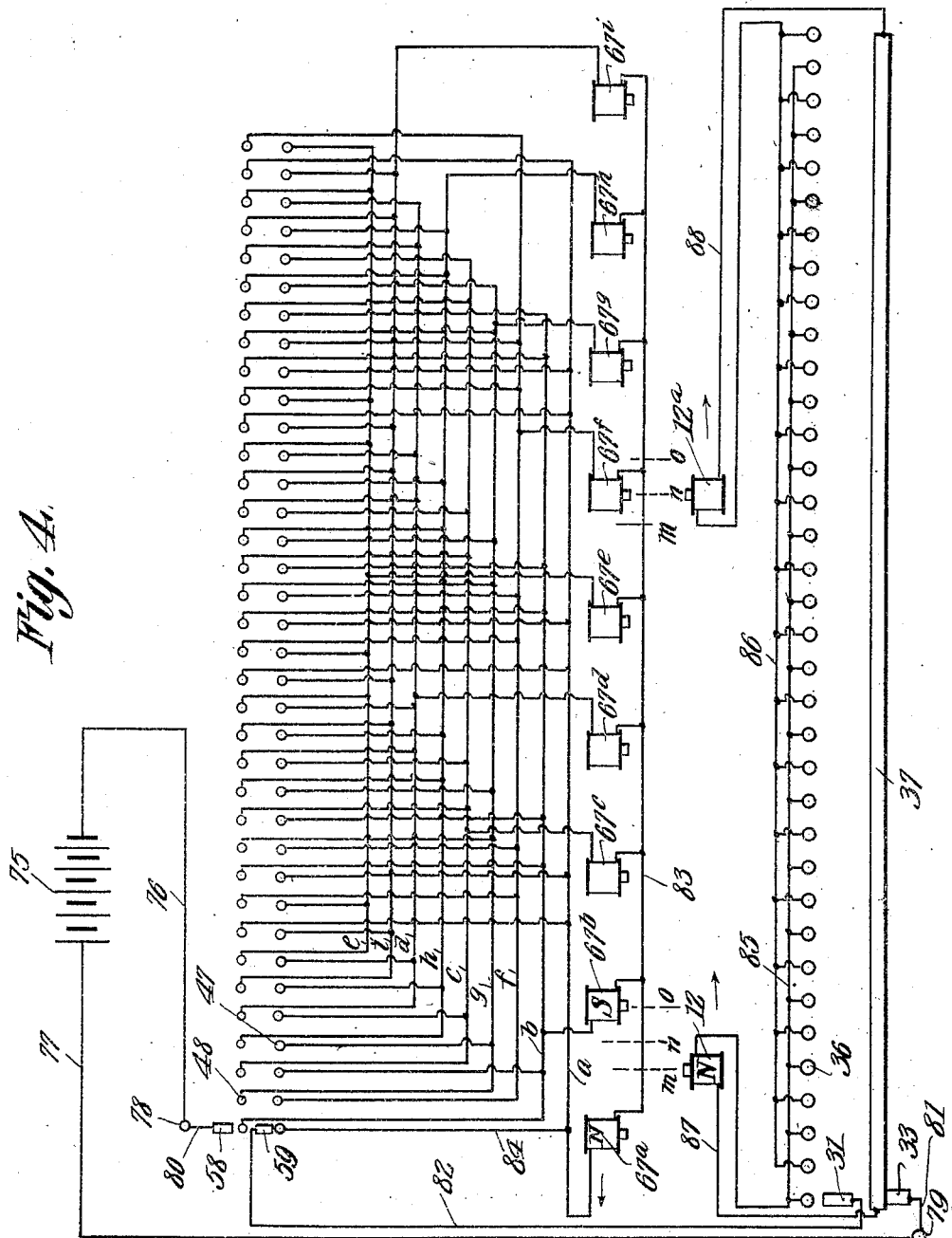

UNITED STATES PATENT OFFICE.

FLOYD W. CASTERLINE, OF TIPTON, IOWA.

ELECTRIC MOTOR.

1,017,510.  Specification of Letters Patent.  Patented Feb. 13, 1912.

Application filed January 9, 1911. Serial No. 601,639.

*To all whom it may concern:*

Be it known that I, FLOYD W. CASTERLINE, a citizen of the United States, residing at Tipton, in the county of Cedar and State of Iowa, have invented a new and useful Electric Motor, of which the following is a specification.

This invention has reference to improvements in electric motors, and its object is to provide a motor in which both the field structure and the armature are rotatable at the same time, whereby power may be taken from either or both elements, and the arrangement is such that a powerful rotative effect is produced.

In accordance with the present invention the field magnets and the armature are mounted to rotate about the same axis in opposite directions and are coupled together in such manner that each reacts on the other through mechanical coupling devices, and by supplying each member with a suitable pulley or other driving means power may be taken from either element of the motor, or from both at the same time, this permitting different directions of drive from the one motor without the necessity of crossed belts or intermediate gearing.

The invention will be best understood from a consideration of the following detailed description taken in connection with the accompanying drawings forming a part of this specification, with the understanding that while the drawings show an operative motor, the invention is susceptible of other embodiments, and consequently is not limited to the exact embodiment shown and described.

In the drawings:—Figure 1 is an elevation of a motor. Fig. 2 is a section on the line 2—2 of Fig. 3, with some parts omitted. Fig. 3 is a section on the line 3—3 of Fig. 2. Fig. 4 is a diagram of the field and armature circuits of the motor.

Referring to the drawings, there is shown a shaft 1 mounted near the ends in bearings 2 carried on pedestals 3 connected by cross pieces 4, although the particular manner of supporting the shaft may be materially varied from the showing of the drawings and in itself does not enter into the present invention. The shaft may be intermediately increased in diameter, as indicated at 5, or this increase in diameter may be brought about by the application of an appropriate sleeve made fast to the shaft in any suitable manner, as by shrinking or keying. One end of this enlarged portion 5 is screw threaded, as indicated at 6, for a purpose which will presently appear.

Mounted on the enlargement 5 about midway of the length of the shaft 1 is a hub 7 secured to the shaft in any appropriate manner, as by a key 8, and this hub carries at diametrically opposite points cores 9 of magnetic material projecting radially from the hub, and each terminating in an expanded pole piece 10, these cores 9 being secured to the hub by screws 11 or otherwise. Each core 9 is surrounded by a coil, there being two coils 12 and 12$^a$, so designated for convenience of description to follow, and the two coils with the parts supporting them constitute what may be termed the armature of the motor, and in this case the shaft 1 constitutes the armature shaft.

Mounted on each pedestal 3 adjacent the bearing 2 carried thereby is a block 13, in which is secured one end of a sleeve 14, the two sleeves projecting toward the center of the motor, but stopping short thereof, these sleeves serving to support certain structures including the field of the motor.

Mounted upon one of the sleeves 14 is a bearing block 15, and mounted on the other sleeve 14 is another bearing block 16. The bearing block 15 is formed on the end toward the armature with a circular series of bevel gear teeth 17, and secured to the shaft 1 adjacent the hub 7 is a bevel gear 18 agreeing in size to the gear formed by the circular series of teeth 17. Mounted upon the sleeve 14 traversing the block 15, which sleeve projects into the space between the gears 17 and 18, is a collar 19 provided with a set screw 20, and this collar may also be secured to the sleeve by a key 21, the collar thus being prevented from rotation, since the sleeve is held from rotation by the block 13, while the set screw 20 will serve to position the collar with reference to the gears 17 and 18. The collar 19 has on one side a radial arm 22 provided with an annular shoulder 23 beyond which the arm constitutes a journal for a bevel pinion 24 held in place by a suitable nut 25 applied to the arm, which at the outer end is appropriately threaded for the purpose. The pinion 24 serves as an intermediary between the gears 17 and 18, so that when either of these gears receives a rotative impulse, the other gear will participate therein, but be caused to rotate in the opposite direction. The same key 8 which serves to lock the hub 7 to the enlargement 5 of the shaft 1 may serve to lock the bevel gear 18 to the said enlargement, so that the bevel gear 18 will always rotate with the shaft 1.

The sleeve 14 carrying the journal block 16, which latter is spaced from the hub 7 about the same distance as the journal block 15, extends a short distance beyond the journal block 16 toward the hub 7, and into this same space the enlargement 5 extends toward the corresponding end of the sleeve 14 under consideration. That portion of the last named sleeve 14 extending beyond the block 16 carries a collar 26 formed with arms 27, 28, shown in Figs. 1 and 3 as extending toward the hub 7 in overhanging relation to the shaft enlargement 5 on opposite sides thereof, the arm 27, however, being of less extent toward the hub 7 than the arm 28. The collar 26 may be secured in place by a set screw 29 shown in Fig. 1. The arm 27 is formed at its free end into an eye traversed by a brush holder 30 carrying a collecting brush 31, while the arm 28 is formed with a similar eye carrying a brush holder 32 traversed by a brush 33.

Mounted on the portion of the enlargement 5 beyond the hub 7 and toward the block 16 is a sleeve 34 of insulating material terminating next to the hub 7 in a disk 35 of insulating material of sufficient radial extent to cover the corresponding end of the hub 7. The sleeve 34 and disk 35 may be made of a single piece of insulating material, or of two pieces, as the exigencies of manufacture may demand. Ordinarily vulcanized fiber will answer for the insulating material here employed, or any other suitable insulating material, not only in the particular connection just named, but throughout the machine, may be used.

Mounted on the sleeve 34 is a circular series of segmental plates 36 extending an appropriate distance toward the adjacent sleeve 14, and at the outer ends of these plates there is a ring 37 separated from the plates 36 by insulating material, indicated at 38. At the outer end of the sleeve 34 there is placed a disk 39 of insulating material held in place by a nut 40 applied to the threaded portion 6 on the shaft 1. The plates 36 constitute a commutator for the armature and the ring 37 constitutes a collecting ring for the armature. The brush 31 is in constant engagement with the ring 37, and the brush 33 is positioned to bear upon the commutator plates 36 as the commutator rotates, the two brushes being held stationary by the collar 26 fast on the end of the appropriate sleeve 14. The plates 36 and the ring 37 are coupled up to the two coils 12 and 12ᵃ in a manner to be described and the brushes 31 and 33 are, also, coupled up in a manner to be described, with especial reference to Fig. 4. In order that the brushes 31 and 33 may contact with the ring 37 and plates 36, respectively, they are each urged by an appropriate spring 41 in the proper direction, the springs 41 being carried by the respective arms 27 and 28. The construction of the brush holders and of the brushes in the specific details as described is not mandatory and any appropriate mounting for the brushes may be employed.

The block 16 is formed with an axial extension 42 immediately surrounding the corresponding sleeve 14 and of less external diameter than the main portion of the block 16. Fast on this extension 42 is a sleeve 43 of insulating material having an annular radial flange 44 where engaging that portion of the block 16 of greater diameter. The end of the extension 42 remote from the body of the block 16 is threaded and receives a lock nut 45, which, through the intermediary of a washer 46, serves to hold the sleeve 43 in place. The sleeve 43 carries a duplex commutator made up of two radial series of segmental commutator plates 47 and 48, respectively, one exterior to the other and appropriately insulated, the plates of each series being insulated one from the other and the two series, also, being insulated one from the other. These two series of plates 47 and 48 are carried by a ring 49 of insulating material mounted on the sleeve 43 to turn therewith, and each plate 47 is connected by a pin 50 with a terminal strip 51, while each plate 48 is connected by a pin 52 with a terminal strip 53, each terminal strip being individual to a respective commutator plate. The two series of plates 51 and 53 are separated by a ring 54 of insulating material, and the strips 51 seat against the flange 44 on the sleeve 43.

Mounted on the adjacent journal bearing 13 is a block 55 of insulating material carrying two brush supporting arms 56, 57, respectively, these arms each sustaining an appropriate brush 58, 59, respectively, in position to bear upon the respective series of plates 47 and 48. Here, again, the particular form of brushes shown is not mandatory, and any appropriate type of collecting brushes known to the art may be employed.

In order to hold the blocks 15 and 16 from moving longitudinally toward the respective bearing blocks 13, the block 15 has an axial extension 60 for engagement with the respective block 13, while there is provided a set collar 61 on the sleeve 14 carrying the block 16 in position to be abutted by the extension 42 on the block 16.

Carried by each block 15, 16, is a circular series of arms 62, each of which may be formed of a rod threaded as shown at 63 enter a threaded socket in the appropriate block 15 or 16, and these arms adjacent the respective block 15 or 16 are bent so as to approach the center line of the motor. At the outer ends each arm is formed into an eye 64 and engages the appropriate edge of a ring 65 to which the arms are secured by bolts 66, each bolt serving to secure matching arms on opposite sides of the ring to the latter. The ring 65 is of appropriate diameter and constitutes the supporting ring for a circular series of electromagnets 67, which in Fig. 4 are designated as 67ª to 67ⁱ, respectively, there being nine such magnets in the particular showing of the drawings, and these designations being adapted for convenience of description when the circuit connections of Fig. 4 are set forth. Each electro-magnet 67 is provided with a core 68 projecting radially inward from the ring 65 to which the core is secured by appropriate bolts 69, and each core terminates at the inner end in an expanded pole piece 70 designed to move in a circular path concentric with and in close relation to the path of travel of the pole pieces 10 of the magnets 12 and 12ª. The arms or rods 62 serve to support the ring 65 with the magnets 67 carried thereon in a circular series projecting radially inward from the inner face thereof, in concentric relation to the armature, and the series of magnets 67 with the supporting structures constitute what may be termed a rotatable field structure, the word rotatable being used in the mechanical and not the electrical sense. The commutator made up of the plates 47 and 48 being fast to the block 16, and the latter being fast to the rotatable field, the two structures move in unison, and circuit connections from the electro-magnets 67 to the plates 47 and 48 may be readily carried along the appropriate rods 62 on the side of the ring 65 adjacent the commutator for the rotatable field. Since the brushes 31 and 33 do not rotate the conductors feeding these brushes may be carried through the corresponding sleeve 14, which is in concentric spaced relation to the shaft 1 where traversed by the latter.

In order that the motor may transmit power, the block 15 is formed with a pulley 71, to which there may be applied a belt 72, and the shaft 1 may be extended beyond one of its journal bearings 2 to there carry a pulley 73 to which may be applied a power transmitting belt 74. Of course, the pulleys and belts may be taken as indicative of any means for transmitting power from the rotatable members of the motor. Since both the armature and field structures rotate in opposite directions, the speed of rotation need be only half that of the rotor of a motor where but one of these members rotates, and consequently the motor may deliver usual power at comparatively low speed, such low speed being conducive to long life of the motor.

In the motor as shown in the drawings, the speed of rotation of the two members is the same, but it is evident that this relation of speed may be readily changed by varying the gearing connections. In the particular structure shown, there are two diametrically opposed armature electromagnets 12 and 12ª, there are nine field magnets 67, and there are thirty-six each of the plates 36, 47, and 48. The practical embodiment of the invention is not limited to the particular numbers of parts mentioned, for other numbers of coils and plates may be employed, but this particular embodiment may be utilized to explain the operation of the motor in connection with the diagram shown in Fig. 4, which is based upon the particular relation of the parts stated.

The motor is, of course, assumed to be fed by current from an external source, which in Fig. 4 is indicated by a battery 75, but this battery is to be taken as simply indicative of any source of electrical current. Connected to opposite sides of the battery 75 are conductors 76 and 77, respectively, which may be taken as indicative of power mains of any type. The main 76 is connected to a terminal 78 which may indicate a binding post on the motor, and the conductor 77 is connected to a terminal 79 which may, also, indicate a binding post on the motor. The binding post 78 is connected by a conductor 80 to the brush 58 in the particular arrangement shown in Fig. 4 and the binding post 79 is connected by a conductor 81 to the brush 33. The brushes 31 and 59 are connected together by a conductor 82.

One side of each field magnet 67 is connected to a common conductor 83. The other side of the respective magnets 67 are connected to respective conductors $a$ to $i$. The conductor $a$ is connected by branch conductors 84 to the first contact plate 47 numbering from the left of Fig. 4, the eighth contact plate 48, the tenth contact plate 47, the seventeenth contact plate 48, the nineteenth contact plate 47, the twenty-sixth contact plate 48, the twenty-eighth contact plate 47, and the thirty-fifth contact plate 48. The field magnet 67ᵇ, connected to the conductor $b$, is connected by branch conductors 84 to the first contact plate 48, the third contact plate 47, the tenth contact plate 48, the twelfth contact plate 47, and so on throughout the series. The magnet 67ᶜ is connected by way of the conductor $c$ to the third contact plate 48, the fifth contact plate 47, the twelfth contact plate 48, the fourteenth contact plate 47 and so on throughout the series. The other field magnets in order are connected up in like manner as shown in Fig. 4, but need not herein further be traced out.

The armature magnet 12 is connected to every alternate contact plate 36 by a common conductor 85, while the magnet 12ª is connected to the remaining contact plates 36 by a common conductor 86, these two conductors 85 and 86 being connected to the respective magnets on one side of the latter, while the other sides of these magnets are connected by respective conductors 87 and 88 to the ring 37.

In the position of the parts indicated in Fig. 4 the magnet 12 is intermediate of the magnets 67ª and 67ᵇ and this intermediate position is designated by the dotted line $m$. The magnet 12ª is opposite the magnet 67ᶠ and this position is indicated by the dotted line $n$. Under these circumstances the brush 31 is in engagement with a contact 36 connected to the magnet 12, while the other side of this magnet is coupled to the ring 37 by the conductor 87, and this ring is engaged by the brush 33 which through the conductors 81 and 77 is constantly in circuit with the battery 75. The brush 31 is coupled by the conductor 82 to the brush 59, and this brush at this time is in engagement with the first one of the contact plates 47, while the other side of the battery is connected by the conductors 76 and 80 to the brush 58 which is now in engagement with the first contact plate 48. The magnet 12 is, therefore, at this time energized, and a circuit may be traced from the battery 75 by the conductors 76 and 80 to the brush 58, thence by the appropriate one of the branch conductors 84 to the conductor $b$, thence to the magnet 67ᵇ, common conductor 83, magnet 67ª, conductor $a$, appropriate branch conductor 84 to the brush 59, thence by conductor 82 to the brush 31 and through the magnet 12, conductor 87, ring 37, brush 33, conductor 81 and conductor 77 back to the battery 75. Since the magnet 12ª is coupled up to the next contact 36 in order it is at this time deënergized, since the circuit through it is not completed.

Let it be assumed that the winding of the magnet 12 is such as to produce a north polarity in its pole piece, and this is indicated by the letter N on the magnet 12. Let it further be supposed that the windings of the magnets 67ª and 67ᵇ are such that at this time the magnet 67ª produced north polarity in its pole piece and the magnet 67ᵇ produces south polarity in its pole piece, these polarities being designated by the respective letters N, S, in Fig. 4. The magnet 12 and the magnet 67ª are, therefore, mutually repellent, while the magnet 12 and the magnet 67ᵇ are mutually attracted, and rotative movement is imparted to both the field structure and the armature structure, because of the intergeared relation of these two structures. The rotative elements of the motor, therefore, move, but in opposite directions, so that the magnet 12 is carried to the position indicated by the line $n$ and the magnet 67ᵇ is carried to the same position. The magnet 12ª, however, which under the conditions assumed was opposite the magnet 67ᶠ and hence in the position indicated by the dotted line $n$, has been carried to the dotted line position $o$, while the magnet 67ᶠ has moved in the reverse direction to the dotted line position $m$, but so long as the magnet 12ª was in the position $n$ and the magnet 67ᶠ was in the same position, both of these magnets were dead, since neither was coupled to the current source. The movement of the magnets 12 and 67ᵇ to the position $n$ has caused a like movement of the commutator plates, so that now the brush 31 is in engagement with the second plate 36, while the brushes 58 and 59 are in engagement with the second commutator plates 47 and 48. The magnets 67ª and 67ᵇ not being coupled to either of the second set of plates 47, 48 are cut out of circuit and the magnet 12 not being coupled to the second contact 36 under consideration is, also, cut out of circuit, so these magnets become dead. There is now established a circuit from the current source 75 by the conductors 76 and 80 to the brush 58, the second contact plate 48, the respective conductor 84 to the conductor $g$, thence to the magnet 67ᵍ, thence to the common conductor 83, thence to the magnet 67ᶠ, to the conductor $f$, to the second contact plate 47, brush 59, conductor 82, brush 31, second contact plate 36, conductor 86, magnet 12ª, conductor 88, ring 37, brush 33, and conductors 81 and 77 back to the current source 75. Let it be assumed that the magnet 12ª develops north polarity while the magnet 67ᶠ also develops north polarity and the magnet 67ᵍ develops south polarity under these conditions. The magnet 67ᶠ is now in the position $m$ and the magnet 12ª is in the position $o$, while the magnet 67ᵍ is moved to the position $n$ adjacent thereto, so that the magnets 12ª and 67ᶠ are repellent and the magnets 12ª and 67ᵍ are attracted, and by this means a second impulse is imparted to the rotary members of the motor, tending to further rotate them in the direction assumed, the magnets 12 and 12ª moving toward the right in Fig. 4 and the magnets 67 moving toward the left in Fig. 4, the direction of movement being indicated by appropriate arrows.

The continued movement has brought the brushes 58 and 59 into engagement with the third of the series of plates 48 and 47, and the brush 31 into engagement with the third contact plate 36. The magnet 12 has by this time reached the position $o$ in which the magnet 67ᵇ is shown as positioned in Fig. 4, while this same magnet 67ᵇ has reached the position m in which the magnet 12 is shown as positioned in Fig. 4. Now, it will be found on tracing the circuits that the direction of current through the magnet 67ᵇ has changed, so that its polarity is changed, since this magnet is now connected with a contact plate of the series 47, but the magnetism of the magnet 12 remains constant as to polarity, so that it is repellent to the magnet 67ᵇ and attractive to the magnet 67ᶜ, the magnet 12ᵃ having in the meantime come opposite the magnet 67ᵍ and again become deënergized or dead.

The magnets 12 and 12ᵃ become alternately energized and deënergized, the energization occurring when they are positioned intermediate of two field magnets and the deënergization occurring when they are opposite the field magnets. The internal circuit connections of the motor are such that the armature magnets become alternately magnetized and demagnetized, while the field magnets become magnetized, demagnetized, and again magnetized to the opposite polarity in proper relation to the armature magnets, while the field magnets remain deënergized during the interval of travel between the points of operative relation to the respective armature magnets, the circuit connections shown being such as to cause the proper electrical conditions in the proper timed relation.

While but a few successive positions of the armature and field have been described, it will be understood that the conditions described with reference to the positions set forth progress about the field as the field and armature rotate in opposite directions, each field magnet in the particular arrangement shown in Fig. 4 receiving current when the brushes 58 and 59 are upon a certain pair of contact plates 48, 47 then receiving current in the opposite direction when the brushes are upon the seventh set of contact plates from those first considered, thence upon the second succeeding set, then upon the seventh succeeding set, and so on.

In the present construction the field magnets are not a multiple of the armature magnets and the arrangement between these sets of magnets should be that of odd and even numbers to bring about the positioning of an armature magnet intermediate of field magnets when another armature magnet is coincident with a field magnet. The pull of the motor is substantially constant, since one or the other of the armature magnets and the corresponding field magnets are active at all times.

What is claimed is:—

1. In an electric motor, a rotatable armature, a rotatable field surrounding the armature, gearing between the armature and field for causing relative rotation thereof in opposite directions, a commutator for the armature carried thereby, a collecting ring rotatable with the armature, a brush holder and mounting therefor preventing rotative movement of the brush holder with the armature, brushes carried by the brush holder and bearing on the commutator and collecting ring, respectively, a duplex commutator carried by and rotatable with the field, and separate brushes for each member of the duplex commutator.

2. In an electric motor, two alined tubular supports, journal blocks mounted for rotation on said supports, a field structure secured to said journal blocks, an armature within the field, a shaft carrying the armature and extending through the tubular supports, bearings for the shaft exterior to the tubular supports, a commutator for the armature mounted on the shaft between the armature and one of the tubular supports, and a commutator mounted on one of the journal blocks supporting the field structure.

3. In an electric motor, oppositely rotatable field and armature members each having electro-magnets, a commutator and collecting ring associated with the armature member and electrically connected to the magnets thereof, brushes in operative relation to the commutator and collecting ring, respectively, a commutator rotatable with the field member and electrically connected with the magnets thereof, brushes in operative relation to the field commutator, an electrical connection between one brush of the field commutator and the brush of the armature commutator, and other connections to the external terminals of the motor from the other brush of the field commutator and the brush of the collecting ring.

4. In an electric motor, a stationary support, a rotatable armature member journaled on the support, a rotatable field member journaled on the support, commutators carried, respectively, by the armature and field members, a collecting ring carried by one of the members, brush holders associated with the members and both mounted on the support, brushes on one of the holders bearing on one of the commutators, and brushes on the other holder bearing, respectively, on the remaining commutator and the collecting ring.

5. In an electric motor, a stationary tubular member, a rotatable armature member associated therewith and having a commutator, a rotatable field member journaled on the tubular member and having a commutator also journaled on the tubular member, a brush holder for the armature commutator secured to the tubular member between the field commutator and the armature member, and a brush holder for the field commutator.

6. In an electric motor, a stationary tubular member, a rotatable armature member having a shaft extending through the tubular member and carrying a commutator adjacent the inner end of the tubular member, a brush holder carried by the said inner end of the tubular member and co-acting with the commutator, a rotatable field member surrounding the armature member and provided with a journal block mounted for rotation on said tubular member, a commutator carried by said journal block, and a brush holder mounted on the tubular member and co-acting with the commutator of the field member.

7. In an electric motor, stationary alined tubular members, a rotatable armature member associated therewith, a field member including a ring surrounding the armature member, journal blocks mounted for rotation on the tubular members and supporting arms between the ring and journal blocks, gearing connecting the inner end of a journal block and the armature member, and a driving member on the end of the journal block carrying the gearing remote from said gearing.

8. In an electric motor, a pair of spaced standards, alined fixed tubular members secured to the standards and projecting one toward the other therefrom, a shaft extending through the tubular members, and journaled on the standards exterior to the tubular members, an armature carried by the shaft between the tubular members, a commutator carried by the armature member and located adjacent the inner end of one of the tubular members, a brush holding means carried by the adjacent tubular member and coacting with the commutator, journal blocks rotatably mounted on the tubular members, gearing connecting one of the journal blocks and the armature member, a power transmitting element on one of the journal blocks, a commutator carried by the other journal block, brush holding means associated with said commutator, a field ring surrounding the armature member, magnets carried by the field ring, arms extending from the journal blocks to the ring for carrying the latter, and a power transmitting element on the shaft.

9. An electric motor having a rotatable armature with windings thereon and a rotatable field member associated therewith and also having windings thereon, a commutator for the armature member, connections from said commutator to the windings of the armature, the commutator having segments connected and related to the windings of the armature to produce therein like poles in alteration at spaced points in said armature member on the rotation of the latter, and a commutator and connections therefrom to the windings of the field member, said connections being related to the field windings to produce reversing magnetic effects in the windings of the field member in operative relation to the active portions of the armature member during the rotation of the field member, those windings unassociated with the active parts of the armature member being then deënergized.

10. An electric motor having a rotatable armature member and a rotatable field member, the armature having windings related to the windings of the field member as two to nine, a commutator coupled to the armature windings to produce like magnetic poles therein in succession and another commutator coupled to the field windings to produce reversing magnetic effects in those windings of the field member in operative relation to the active windings of the armature member, the other windings of the field member being deënergized while unassociated with the active armature windings.

11. In an electric motor, an armature provided with electro-magnets, a field structure provided with electro-magnets differing in number from the number of the magnets of the armature, a commutator coupled to the armature magnets to produce like magnetic poles in the armature magnets in succession, and a commutator having series of segments with plates of each series, spaced apart by a number equal to the number of field magnets, connected to the same field magnet and the segments of one series so connected being shifted with relation to the similarly connected plates of the other series in accordance with the number of armature magnets.

12. In an electric motor, an armature provided with electro-magnets, a field structure provided with electro-magnets differing in number from the number of the magnets of the armature, means for causing the simultaneous rotation in opposite directions of the armature and field structure when the motor is in operation, a commutator coupled to the armature magnets to produce like magnetic poles in the armature magnets in succession, and a commutator having series of segments with plates of each series, spaced apart by a number equal to the number of field magnets, connected to the same field magnet and the segments of one series so connected being shifted with relation to the similarly connected plates of the other series in accordance with the number of armature magnets.

13. In an electric motor, a rotatable field structure and a rotatable armature, each provided with electro-magnets, the field structure being rotatable in a direction opposite to the direction of rotation of the armature and provided with a greater number of electro-magnets than the armature, a commutator for the armature connected to the armature magnets to cause their energization in succession when relatively positioned between two field magnets, and a commutator connected to the field magnets to cause the energization of the field magnets in operative relation to the energized armature magnets and the reversal of each field magnet after it passes the position of coincidence with a respective armature magnet.

14. An electric motor comprising a rotatable field structure, a rotatable armature, means for causing the rotation of the armature and field simultaneously in opposite directions, a commutator for the armature comprising successive commutator plates connected each to one side of an armature winding, and a collecting ring forming a common connection for the other sides of the armature windings, a commutator for the field windings comprising two radially related sets of commutator plates connected in groups to respective field windings, separate brushes for the commutator plates and ring connected to the armature windings and for the two radial sets of commutator plates connected to the field windings, and circuit connections between one armature brush and one field brush and between the other two brushes and the external terminals of the motor.

In testimony, that I claim the foregoing as my own, I have hereto affixed my signature in the presence of two witnesses.

FLOYD W. CASTERLINE.

Witnesses:
F. J. CASTERLINE,
H. PERRIN.